Figure 1:
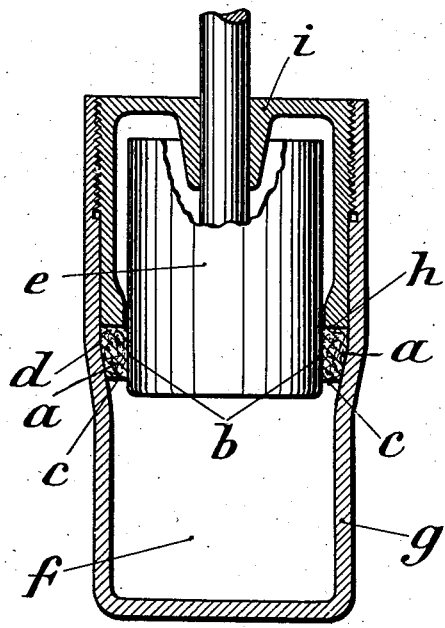

Feb. 24, 1931.  F. FAUDI  1,793,738
STUFFING BOX
Filed April 14, 1927

INVENTOR
Fritz Faudi
by [signature]
his attorney

Patented Feb. 24, 1931

1,793,738

UNITED STATES PATENT OFFICE

FRITZ FAUDI, OF SOMMERDA, GERMANY

STUFFING BOX

Application filed April 14, 1927, Serial No. 183,800, and in Germany May 4, 1926.

The invention relates to the packing of stuffing boxes and has in particular reference to stuffing boxes of the kind as employed for instance in pneumatic shock absorber cylinders mounted on the running gear of motor cars and in which a plunger reciprocates in a cylinder enclosing it and containing compressed air. The means hitherto proposed and employed for tightening the elements of these pneumatic shock absorbers either failed throughout or did not work in a satisfying manner. For, a packing arrangement destined for such absorbers must not only satisfy with high compression of the enclosed air and during a long rest, but must also resist with security the violent shocks of different forces as they often arise uninterruptedly when the car is running.

In the best-known type of stuffing box packings the packing material is enclosed between two annular abutment faces opposite to one another in the direction of the axis of the cylinder, and the cylindrical wall that concentrically surrounds the plunger, the packing material being pressed against all tightening faces by shifting said abutment faces toward each other. Hence, a sufficient tightening pressure has to be produced not only between plunger, cylinder and the packing material inserted between these parts, but also between the material and the two abutment faces. This causes an objectionably high friction between the contacting faces of the plunger and packing that reduces the freedom of motion of the plunger.

Now, the object of my present invention is to have a packing arrangement for stuffing boxes that is in principle of the type hereinbefore described and thus maintains the greatest possible simplicity. My stuffing box, however, is of a special design that results in a very reliable and sure tightening effect under all conditions, viz., when the absorber is at rest or when exposed to the shocks, with high or low pressure exerted by the air enclosed in the absorber cylinder and loaded by the plunger. As tests proved, no air escapes, nor does a decrease of pressure take place after a several days' rest of the absorber under pressure, nor does the pressure decrease after an extended use of the absorber. On the contrary, my new packing works in such a manner that slow or violent increases of the pressure even cause an increased tightening effect on the tightening faces.

Figure 2:
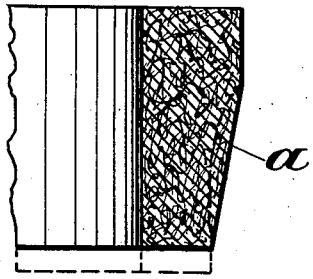

In order to allow my invention to be more easily understood, a preferred embodiment of same is illustrated by way of example in the drawing which accompanies and forms part of this specification. In this drawing:

Fig. 1 is a longitudinal section through a pneumatic shock absorber equipped with my improved packing, Fig. 2 is a section through the packing ring in enlarged scale.

The packing ring $a$ consists of a material that is not wholly inelastic, but has a certain measure of elasticity so as to be expansible and contractible, preferably india-rubber vulcanized up to a certain hardness, or the like. The ring $a$ is lodged in an annular hollow space the inner wall $b$ of which is formed by the cylindrical shell surface of the plunger $e$ whilst its outer wall is formed by the wall of the absorber cylinder, which is of conical shape at this place, denoted by $c$, and is narrowed from the place $d$ where the plunger $e$ enters the closed compressed air chamber of the cylinder. The packing space has its largest diameter at $d$, where the plunger $e$ enters, and is closed here by an abutment shoulder formed by the annular front edge $h$ at the inner open end of the cover $i$ screwed into the cylinder $g$, and which cover forms a receiving chamber at the end of the cylinder opposite the compression chamber into which the plunger moves on its return stroke. The shape of the packing ring $a$ corresponds to the described configuration of the packing space, the ring $a$ thus being confined by a conical shell surface preferably subsiding into a cylindrical one and the narrowed portion of which is turned away, after the ring $a$ has been built in, from the place $d$ where the plunger $e$ enters, by a cylindrical face abutting against plunger $e$, and by an annular face, normal thereto, that after the ring has been inserted, is turned toward the entrance place $d$ of plunger $e$ and abuts against the front face $h$ of cover $i$. On the opposite side the packing ring is confined by a narrower annular face which extends in parallel to the former, and may be flat or curved.

The described packing arrangement operates as follows:

In assembling the parts, a moderate initial tension is imparted to the packing ring $a$ for obtaining a preliminary tightening effect, by tightening up the cover $i$, in order to firstly press the material of the ring $a$ against its abutments and to cause its tapering portion to fit in the corresponding portion of the packing space. The air pressure prevailing in the chamber $f$ and varying with the different shocks, acts upon the smaller lower front face of the ring $a$ and compresses the latter in longitudinal direction. When a real compression takes place, it causes the material of ring $a$ to come free from the narrowed face $c$ and the compressed air to enter the annular gap thus produced. A pressure thus acts upon the lower portion of the conical outer face of ring $a$. Now, either no counter air pressure acts against this inwardly directed pressure on the inner face of ring $a$, or the inwardly directed greater pressure, resulting from the difference of the diameters, pushes away the compressed air that has entered between the ring $a$ and the periphery of plunger $e$ and causes the ring $a$ to tightly abut here again.

The ring $a$ undergoes a deformation, as shown in Fig. 2 by dotted lines. As a consequence thereof, the material of ring $a$ tends to lengthen and to advance into the narrowed space. This deformation, however, results in a tighter abutment both toward the periphery of plunger $e$ and absorber cylinder $g$. In the opposite direction the material of the ring likewise tends to advance due to said deformation, whereby a jumping of the upper portion of ring $a$ and thus a more intimate abutment is caused even at this end.

Serious tests have confirmed the fact that on the one hand the tightening effect is maintained for weeks not only with the plunger at rest but also with the same in use, and with considerably varying pressure, whilst on the other hand the pressure exerted by the packing ring $a$ on the plunger $e$ always reaches only the extent that is absolutely necessary, so that the easiest possible movability of the plunger is secured.

The pressure adapts itself always to the height of the pressure just prevailing in the compressed air chamber $f$, it adjusts itself thus automatically and affords therefore always a reliable air cushion.

The described operation may take place anew from time to time, as it will clearly be understood from the foregoing.

What I claim as my invention and desire to secure by Letters-Patent, is:—

1. In a packing for use between a cylinder, a piston operating therein, and a piston guide member presenting an annular abutment shoulder surrounding the piston and lying adjacent to but in rear of the forward end of the piston in all positions of the latter, that portion of the wall of the cylinder lying immediately in advance of said abutment shoulder and opposite the piston being longitudinally tapered in the direction of forward movement of the piston, whereby an annular packing recess of wedge-shaped cross-section is formed between the abutment shoulder, the tapering portion of the wall of the cylinder and the lateral face of the piston, and an annular packing member of elastically deformable material corresponding in cross-sectional shape to and fitted in said recess.

2. In a packing for use between a cylinder, a piston operating therein, and a guide for the piston presenting an annular abutment shoulder surrounding the piston and lying adjacent to but in rear of the forward end of the piston in all positions of the latter, that portion of the wall of the cylinder lying immediately in advance of the shoulder in the direction of forward movement of the piston being of cylindrical form adjacent to the shoulder and thence tapering in a forward direction, whereby an annular packing recess cross-sectionally of angular form at the rear thereof and thence tapering in its forward direction is formed between the abutment shoulder, such portions of the wall of the cylinder and the lateral face of the piston, and an annular packing member of elastically deformable material corresponding in cross-sectional shape to and fitted in said recess.

In testimony whereof I have affixed my signature.

FRITZ FAUDI